May 12, 1925.

O. O. R. SCHWIDETZKY

SPECIFIC GRAVITY TESTER

Filed April 23, 1923

1,537,888

WITNESSES
Frederick Diehl.
A. L. Kitchin

INVENTOR
OSCAR O. R. SCHWIDETZKY
BY Munn & Co.
ATTORNEYS

Patented May 12, 1925.

1,537,888

UNITED STATES PATENT OFFICE.

OSCAR O. R. SCHWIDETZKY, OF HASBROUCK HEIGHTS, NEW JERSEY, ASSIGNOR TO BECTON, DICKINSON & CO., OF RUTHERFORD, NEW JERSEY, A CORPORATION OF NEW JERSEY.

SPECIFIC-GRAVITY TESTER.

Application filed April 23, 1923. Serial No. 634,074.

*To all whom it may concern:*

Be it known that I, OSCAR O. R. SCHWIDETZKY, a citizen of the United States, and a resident of Hasbrouck Heights, in the county of Bergen and State of New Jersey, have invented a new and Improved Specific-Gravity Tester, of which the following is a full, clear, and exact description.

This invention relates to specific gravity testers and has for an object to provide a simple efficient construction which will always give an accurate reading.

Another object is to provide a testing device in which a container is presented having means for guiding the hydrometer in such a manner as to reduce the friction to a minimum.

A still further object of the invention is to provide a simple testing device using a hydrometer in which comparatively sharp guiding edges are presented to the hydrometer for holding the same out of contact with other parts of the container and thereby permit the proper action of the hydrometer.

In the accompanying drawing—

Figure 1:
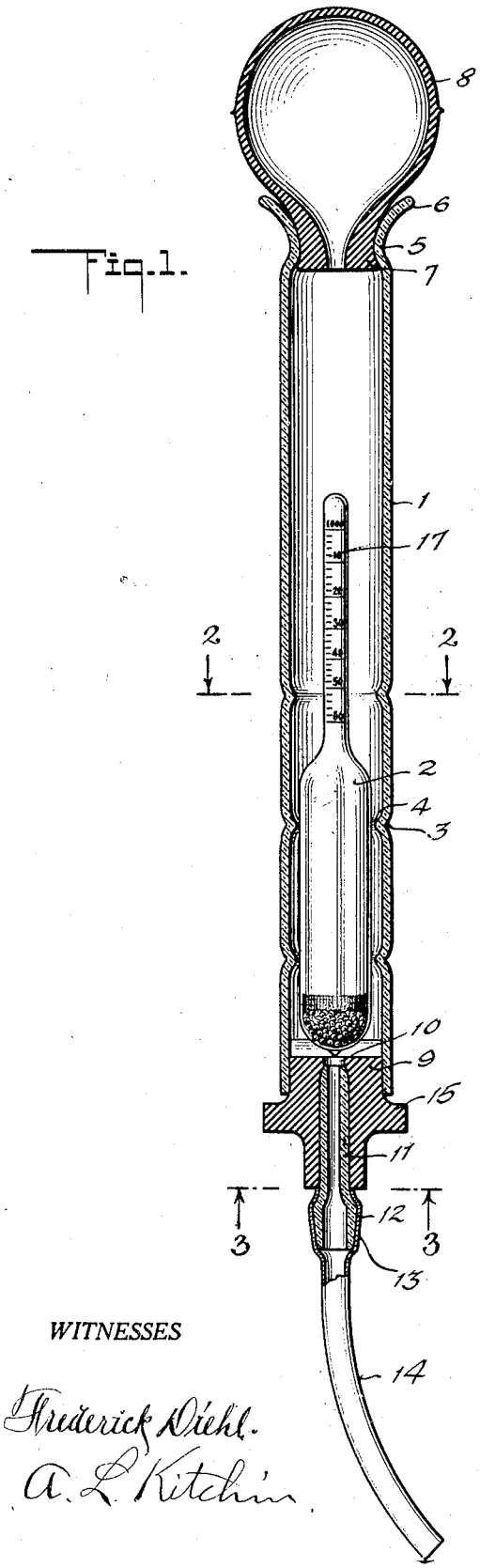
Figure 1 is a longitudinal vertical section through a tester disclosing an embodiment of the invention.
Figure 2:
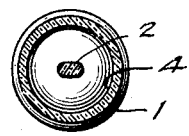
Figure 2 is a sectional view through Figure 1 approximately on line 2—2.
Figure 3:
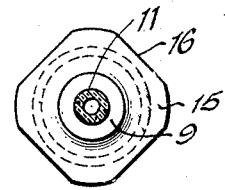
Figure 3 is a sectional view through Figure 1 approximately on line 3—3.

Referring to the accompanying drawing by numerals, 1 indicates a container which is preferably of glass and which is open at both ends. This container is made preferably of glass in order to readily observe the action of the hydrometer or other testing instrument 2. The container 1 is provided with a plurality of spaced depressions 3, which on the interior surface form ridges or edges 4, said edges being comparatively sharp so that the contact between the same and the hydrometer 2 will be very slight and the hydrometer will, therefore, be supported wholly by the liquid in the container when the device is in use. By thus causing the hydrometer to remain out of contact with the walls of the container, a true reading may be secured.

It will be noted that the edges or ridges 4 are spaced apart a sufficient distance to provide always two edges or ridges in engagement with the body of the hydrometer, whereby the hydrometer is always held substantially parallel with the walls of the container 1. At the upper end, the container 1 is preferably restricted at 5 and then flared at 6 to provide a neck portion for receiving the restricted and thickened portion 7 of the bulb 8. It is preferably an ordinary hollow rubber bulb designed to be collapsed and then permitted to distend for drawing liquid into the container 1 when a test is to be made. At the end opposite the restricted end 5, an opening of the full diameter of the container 1 is presented though a less or larger opening could be provided if preferred. At the lower end of the container, as shown in Figure 1, a plug 9 is provided and fitted snugly into the container, said plug being of any desired material, as for instance, a good grade of rubber and designed to extend a sufficient distance into the container to be held therein by friction. This plug is provided with a central aperture or bore 10 into which a tube 11 is forced which preferably spreads the material surrounding the aperture and thereby the same is held in place by friction. The upper end of the tube 11 is preferably beveled while the lower end is provided with an enlarged section or head 12 over which the end 13 of tube 14 is fitted, said tube 14 being a rubber hose or any desired form of tubular member. By providing a structure whereby the bulb and the plug are held in place by friction, the hydrometer 2 may be removed easily at any time and the parts thoroughly cleaned and reassembled with a minimum effort and without any danger of breakage.

In operation, when it is desired to secure a reading, the tube 14 is inserted into a quantity of the liquid to be tested and the bulb 8 is deflated, though if preferred, the bulb 8 could be deflated first and the tube 14 inserted into the liquid afterwards. When the bulb 8 is deflated and the tube 14 is in a given liquid and the bulb 8 is released, the automatic expansion of this bulb back to its normal position as shown in Figure 1, will cause a rarefaction of the upper part of the container 1 and, consequently, will draw into the container a given quantity of liquid sufficient to float the hydrometer or other measuring instrument. As the hydrometer 2 floats, it cannot come in contact with the sides of the container 1 by reason of the various comparatively sharp edges 4 and, consequently, will give a true reading and the graduations 17 may be readily seen through the glass container 1. Preferably, before the reading is taken, the tube 14 is collapsed or bent at a given point and the end removed from the liquid whereby the device may be carried to any desired place to observe the reading on the scale 17. After the desired reading has taken place, the tube 14 is released and the liquid is allowed to flow from the container 1, said flow being assisted if desired, by the manually collapsing bulb 8. The bulb 8 and plug 9, together with the hydrometer 2, may then be removed from the container and the parts cleaned and reassembled for the next testing operation. It will be understood that this device may be used for testing any kind of liquid, as for instance, the electrolyte of storage batteries, urine and other liquid where an accurate reading is very desirable.

What I claim is:—

1. A specific gravity tester, comprising a glass container, formed with a plurality of integral spaced annular inwardly extending portions presenting edges, and a hydrometer arranged in the container adapted to be guided by said edges, said edges being so positioned that the hydrometer will be continually engaged by two of the edges.

2. A specific gravity tester, comprising a container formed with comparatively thin walls having spaced portions thereof pressed inwardly to present spaced annular edges interiorly of the container, and a testing instrument arranged in the container formed with a body of a length to remain in engagement with at least two of said edges continually.

3. A specific gravity tester formed with a container of glass having comparatively thin walls pressed inwardly at a plurality of spaced points until annular beads or edges are presented interiorly of the container designed to prevent a testing instrument carried by the container from touching the sides of the container.

4. In a specific gravity tester, a glass container provided with a plurality of inwardly extending annular portions presenting interior integral edges, said edges being spaced apart and acting as means for preventing a test instrument used in the container from touching the sides of the container.

5. A specific gravity tester formed with a straight tubular container of glass open at both ends and having walls formed with inwardly extending portions at a plurality of spaced points for forming inwardly extending annular beads acting as guiding means for any testing device arranged in the container.

OSCAR O. R. SCHWIDETZKY.